J. ROBERTSON, Jr.
LAST FOR FORMING REPAIR PATCHES.
APPLICATION FILED OCT. 22, 1921.
1,409,582.
Patented Mar. 14, 1922.
2 SHEETS—SHEET 1.
Fig. 1.
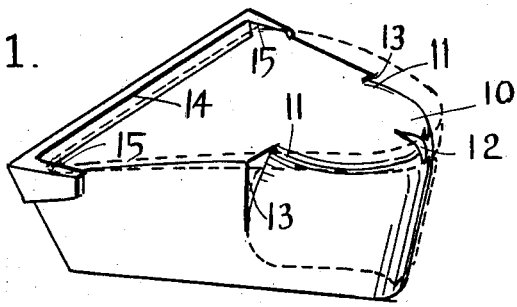
Fig. 2.
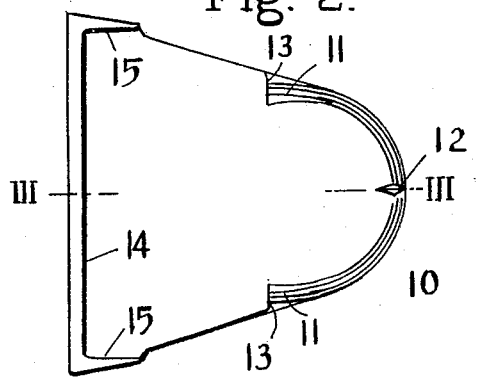
Fig. 3.
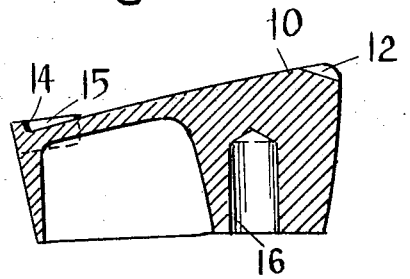
Fig. 4.
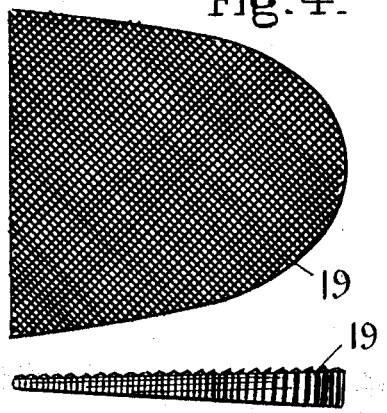
Fig. 6.
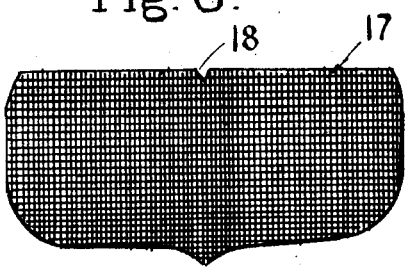
Fig. 5.
Inventor,
James Robertson, Jr.,
By Samuel W. Balch
Attorney.

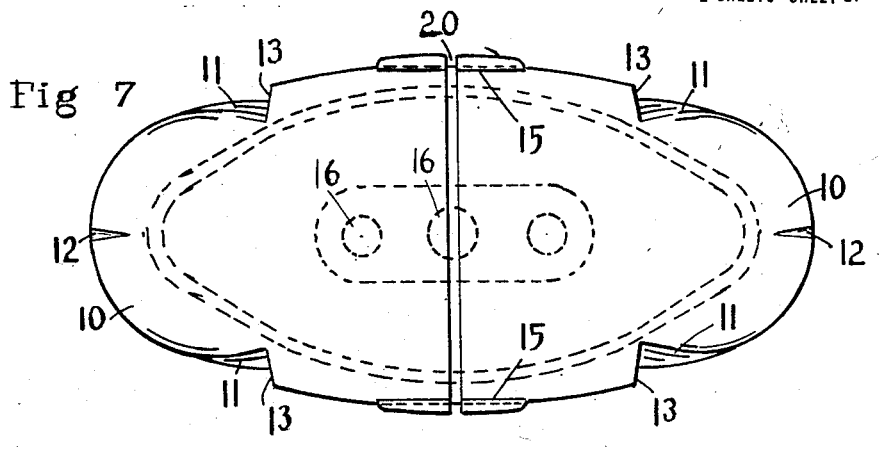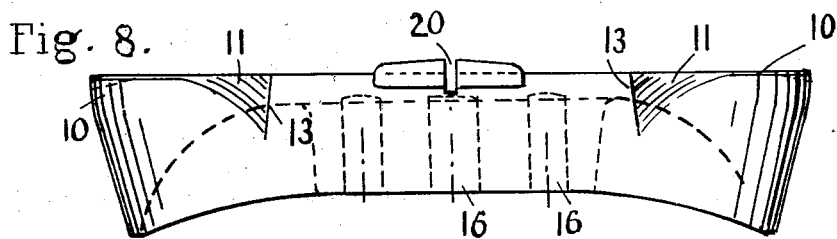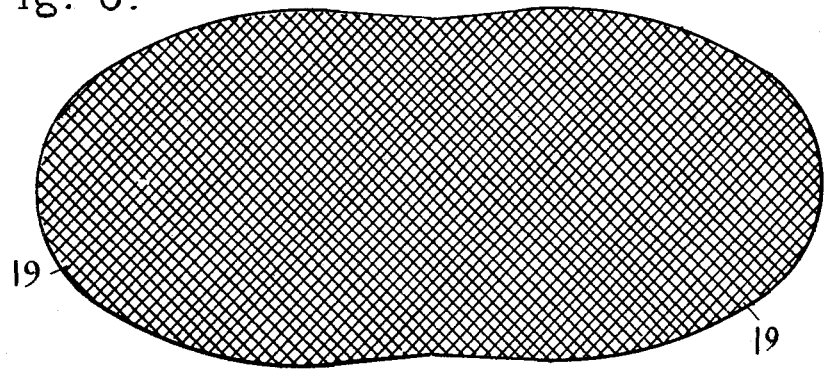

UNITED STATES PATENT OFFICE.

JAMES ROBERTSON, JR., OF WEEHAWKEN, NEW JERSEY.

LAST FOR FORMING REPAIR PATCHES.

1,409,582.   Specification of Letters Patent.   Patented Mar. 14, 1922.

Application filed October 22, 1921. Serial No. 509,687.

*To all whom it may concern:*

Be it known that I, JAMES ROBERTSON, Jr., a citizen of the United States of America, residing at Weehawken, county of Hudson, and State of New Jersey, have invented certain new and useful Improvements in Lasts for Forming Repair Patches, of which the following is a specification.

The object of this invention is to provide a last on which to form a repair patch for the heel or toe of rubber footwear such as is set forth in my United States Reissue Patent No. 15,201, reissued Sept. 20, 1921. The repair patch comprises a tread portion of rubber rounded at one end and a flexible and elastic flange upstanding from the rounded end of the tread portion. In the particular form of repair patch formed on this last the tread portion and the flange are of separate pieces of rubber, the latter being cut from a thin sheet. The last is constructed so as to enable these parts to be accurately and expeditiously formed and positioned with respect to each other and retained while they are being vulcanized.

In the accompanying two sheets of drawings which form a part of this specification—

Figure 1 is a perspective of one form of last which embodies this invention, a repair patch thereon being indicated in dotted lines.

Fig. 2 is a plan view of the last.

Fig. 3 is a vertical section on the line III—III of Fig. 2.

Figs. 4 and 5 are plan and side views of the tread portion for the repair patch.

Fig. 6 is the blank for the flange.

Fig. 7 is a plan of a modified form of last on which two repair patches are made at the same time.

Fig. 8 is a side view of the same.

Figs. 9 and 10 are plan and side views of the tread portion for two repair patches used with this form of last.

The last consists of a block with a substantially flat top and a rounded end 10 upon which is wrapped a sheet of uncured gum which has been cut with a die to the proper form for forming the flange of the repair patch. Where the ends of the sheet are wrapped are sides 11, 11, sloping toward the top. A central gage mark 12 in the form of a notch is provided at the middle point of the curved end to assist the operative in positioning the flange on the last. Gage shoulders 13, 13, beyond the sides sloping towards the top, also assist the operative in correctly positioning the flange. A front gage 14 in cooperation with side gages 15, 15 opposite the rounded end of the block assist the operative in positioning the tread portion. The block may be of wood or metal, and is preferably of aluminum. It has a socket 16 in its under side for a jack post by which it is held while in use. A blank 17 for the flange has a gage mark 18 in the form of a notch at the middle point of one edge. This gage point is brought opposite the gage mark at the middle point of the curved end of the block and the blank is wrapped about the curved end with its edge projecting above the top of the block. The ends come to the shoulders at the sides of the block and the edge which projects above is turned over on the top of the block. The blank is of uncured rubber compound and adheres to the block when wrapped thereon. A tread portion 19 also of uncured rubber compound, which has been cut with a die from a thicker sheet calendered taper, is then laid on the top of the block and pressed down on the turned over edge of the flange after the corners at the ends of its straight edge have have been brought to the meeting points of the front and side gages. Beyond the shoulders to which the ends of the flange come the top of the block is wide enough to wholly support the tread portion and keep it from curling while vulcanizing.

In the modified form of last shown in Figs. 7 and 8 two blocks such as is shown in Figs. 1, 2 and 3 are cast together, except that the front gages are omitted, the side gages only being retained and a cutting groove 20 is located in the top at the point of meeting. In using this form the blanks for the flanges of the repair patches are wrapped about each end as above described and a blank formed of two tread portions in one piece is laid on the top of the last between the side gages and so that the rounded ends of the blank will equally overhang the rounded ends of the last. The blank for the two treads is pressed down on the inturned edges of the two flange blanks and the last with the parts adhering is put into an oven and the parts vulcanized. After vulcanizing the tread portion is cut in two equal parts by drawing a knife along the cutting groove in the top of the last.

I claim—

1. A last consisting of a block rounded at one end for forming thereon the flange of a repair patch and having gages for positioning the tread portion of the repair patch, substantially as described.

2. A last consisting of a block rounded at one end for forming thereon the flange of a repair patch and having the sides sloping toward the top against which the ends of the flange are formed, substantially as described.

3. A last consisting of a block rounded at one end for forming thereon the flange of a repair patch and having the sides sloping toward the top against which the ends of the flange are formed and having shoulders for positioning the ends of the flange, substantially as described.

4. A last consisting of a block rounded at one end for forming thereon the flange of a repair patch and having the sides sloping toward the top against which the ends of the flange are formed, having shoulders for positioning the ends of the flange, and having its top beyond the shoulders wide enough to wholly support the tread portion of the repair patch, substantially as described.

5. A last consisting of a block rounded at opposite ends for forming at each end the flange for a repair patch, and having a top with gages at the sides for positioning a blank for the tread portions of two repair patches, substantially as described.

6. A last consisting of a block rounded at opposite ends for forming at each end the flange for a repair patch, having a top with gages at the sides for positioning a blank for the tread portions of two repair patches, and having a cutting groove in the top midway of the rounded ends for guiding a knife in severing the blank for the tread portions, substantially as described.

7. A last consisting of a block rounded at opposite ends for forming at each end the flange for a repair patch, having sides sloping toward the top adjacent to each rounded end against which the ends of the flanges are formed, having shoulders for positioning the ends of the flanges, and having its top between the shoulders wide enough to wholly support a blank for the tread portions of two repair patches, substantially as described.

8. A last consisting of a block rounded at opposite ends for forming at each end the flange for a repair patch, having sides sloping toward the top adjacent to each rounded end against which the ends of the flanges are formed, having shoulders for positioning the ends of the flanges, having its top between the shoulders wide enough to wholly support a blank for the tread portions of two repair patches, and having a cutting groove in the top midway of the rounded ends for guiding a knife in severing the blank for the tread portions, substantially as described.

JAMES ROBERTSON, Jr.